Figure 1:
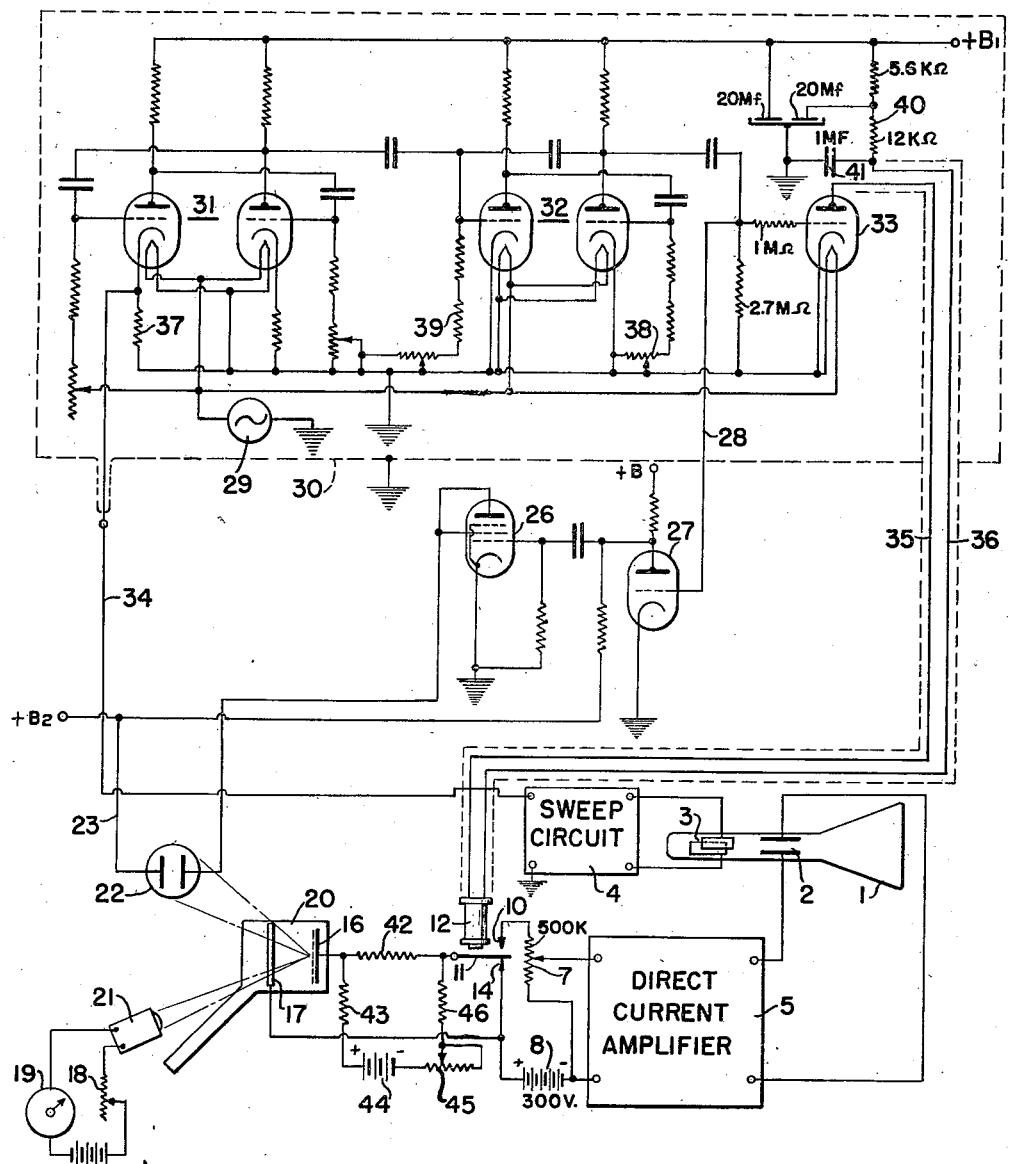

June 19, 1945.   L. F. MAYLE   2,378,857

VISUAL INDICATING SYSTEM

Filed Jan. 16, 1943

INVENTOR
LOUIS F. MAYLE
BY
ATTORNEY

Patented June 19, 1945

2,378,857

UNITED STATES PATENT OFFICE 2,378,857

VISUAL INDICATING SYSTEM

Louis F. Mayle, Fort Wayne, Ind., assignor to Farnsworth Television and Radio Corporation, a corporation of Delaware Application January 16, 1943, Serial No. 472,572

9 Claims. (Cl. 315—364)

This invention relates generally to indicating devices and more particularly to a method and apparatus for visually measuring and indicating the sensitivity of a mosaic in a light-sensitive picture transmitting tube.

It is common practice in the manufacture of cathode ray tubes, of the type known as iconoscopes, to place a flat insulating member such as mica within the envelope of the tube and vaporize caesium by a process of baking, whereby it is condensed on the surface of the member to form a mosaic surface. It is difficult to arrive at a mosaic surface of caesium which consists of individual islands since, in condensing, the caesium particles become joined together to form a substantially continuous surface. Therefore, after the caesium is deposited on the mosaic member, the tube is connected to an evacuation pump while being baked whereby the tube is simultaneously baked and evacuated to vaporize and remove excess caesium from the surface of the mosaic. This process continues until there are discrete islands of caesium and a predetermined degree of sensitivity of the mosaic is attained.

The problem of measuring the sensitivity during the baking process is difficult as it is desirable to carry on the baking process until a predetermined degree of sensitivity is attained and this requires constant measurement of the sensitivity. Previous methods of measurement have been found to be inaccurate and difficult to apply.

It is the primary object of this invention to provide a method and apparatus for continuously measuring the sensitivity of an iconoscope mosaic while the iconoscope is in the process of manufacture.

It is a further object of this invention to provide a cathode ray oscillograph adapted to give a continuous visual indication of sensitivity of an iconoscope mosaic while it is in the process of manufacture.

A still further object of this invention is to overcome the effects of thermionic currents generated by an iconoscope mosaic while it is in the process of manufacture and while its sensitivity is being qualitatively measured.

In accordance with this invention, there is provided a visual means of examining an iconoscope mosaic charging characteristic from which the mosaic sensitivity and leakage may be qualitatively ascertained. While the iconoscope is on the pumps and being baked, it is so arranged that a source of light may be focused to form a spot of light at the surface of the mosaic of the order of three quarters of an inch in diameter. There is provided a charging circuit adapted to be periodically connected between the anode and the mosaic of an iconoscope during its process of manufacture. There is also provided a cathode ray oscillograph having one set of deflecting plates connected to the charging circuit through a D. C. amplifier and the other set of deflecting plates connected to the conventional sweep circuit of the oscillograph.

The charging circuit and the sweep circuit of the oscillograph are controlled by a timing circuit which provides a synchronizing pulse for controlling the sweep circuit and a pulse of a different frequency for periodically charging and discharging the mosaic of the iconoscope. The timing circuit comprises two cascaded multivibrators, the first of which is synchronized from a 60-cycle alternating current source to provide a frequency division of three and an output frequency of 20 cycles. This output is employed to synchronize the second multivibrator to provide a synchronizing pulse for controlling the sweep circuit and consequently the horizontal deflection of the oscillograph. The second multivibrator performs a frequency division of 10 to 15 to provide in its output a frequency of 2 to 2½ cycles per second depending upon the adjustment of the circuit constants. This output is employed to actuate a relay in the charging circuit of the mosaic for opening and closing it at the rate of 2 cycles per second, thereby to provide a vertical deflection in the oscillograph, the amplitude of which varies with the charge absorbed on the illuminated area of the mosaic in the iconoscope. Thus, as the iconoscope is charged and discharged, there appears on the screen of the oscillograph a trace having a form representative of the sensitivity to light of the mosaic structure.

There is also provided a glow lamp in proximity to the iconoscope for flood-lighting the entire surface of the mosaic, the object being to overcome the effect of leakage of charge in the area surrounding the spot of light which is utilized for illuminating the ¾" area. The glow lamp is energized during the intervals between the two cycle pulses for discharging the entire mosaic. Thus, there can be no error in sensitivity measurement due to charge leakage in the area surrounding the light spot.

It also happens that during the baking process of a mosaic there is thermionic emission from the mosaic surface and, therefore, corresponding current flows in the charging circuit. There is also provided, in accordance with this invention, an auxiliary circuit connected to the charging circuit for bucking and eliminating the effect of thermionic currents flowing therein during the baking process.

For a better understanding of the invention, together with other and further objects thereof, reference is made to the following description taken in connection with the accompanying drawing, and its scope and its steps will be pointed out in the appended claims.

Figure 2:
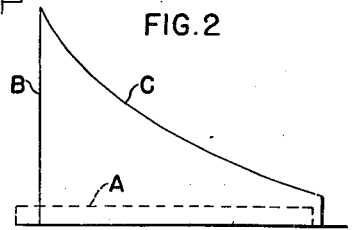

In the accompanying drawing:

Fig. 1 of the drawing is a circuit diagram illustrating an oscillograph circuit connected to the mosaic of an iconoscope;

Fig. 2 of the drawing illustrates the configuration of the trace made by the cathode ray in the oscillograph during one charge and discharge period.

Referring particularly to Fig. 1 of the drawing, there is provided a cathode ray tube 1 having vertical deflecting plates 2 and horizontal deflecting plates 3. The vertical deflecting plates 2 are connected to the output circuit of the direct current amplifier 5, the input circuit of which is connected to a load resistor 7 and polarizing battery 8. The upper terminal of resistor 7 is connected to relay contact 10 which is closed by the armature 11 of relay 12. Armature 11 and the lower contact 14 of relay 12 are connected to the mosaic 16 and anode 17, respectively, of iconoscope 20.

A spot of about ¾" diameter on the mosaic 16 is illuminated by the light source 21, and its intensity may be controlled by a rheostat 18 in accordance with the indication given by meter 19.

Relay 12 is periodically energized by a pulse generator 30 consisting of two cascaded multivibrators 31 and 32. Section 31 is connected through conductor 34 to sweep circuit 4 which controls the potentials on plate 3 of tube 1. Section 32 is connected to the input circuit of a clipper and amplifier tube 33, the output circuit of which consists of conductors 35, 36 and relay winding 12. The multivibrator 31 is conventional in form and is synchronized from a source 29 of 60-cycle alternating current for dividing the 60-cycle source by 3 to thereby generate a 20-cycle train of impulses. The 20-cycle impulses are derived from cathode resistor 37 to synchronize the horizontal sweep circuit 4 of the oscilloscope. The second multivibrator 32 is driven by multivibrator 31 to divide the 20-cycle output by 10, thereby generating a 2-cycle pulse, the width of which is controlled by the value of resistor 38 and the frequency of which is controlled by the value of resistor 39. The relay actuating circuit including conductors 35 and 36 embody a time constant circuit composed of a resistor 40 and a condenser 41. The purpose of this time constant circuit will be evident when the operation of the circuit is described.

The mosaic 16 of iconoscope 20 is flood-lighted by means of a glow lamp 22 which is energized by the output of tube 26. Tube 27 is connected by conductor 28 to the multivibrator 32, whereby the glow lamp 22 is energized at the same rate as relay 12 but in opposite phase. The other terminal of lamp 22 is connected to the plate supply +B₂.

As the iconoscope 20 is subjected to high temperatures for the purpose of baking the mosaic 16, a thermionic flow of electrons occurs in the charging circuit which includes armature 11, contact 10 and resistor 7, and, therefore, a false indication of sensivity tends to result. Resistor 42 is connected in series between armature 11 and mosaic 16, and across the resistor 42 there is connected in series a resistor 43, battery 44, potentiometer 45 and resistor 46. By bringing the baking oven up to baking temperature and heating the tube 20 at this temperature, it is possible to measure the flow of thermionic current and adjust potentiometer 45 to provide a bucking potential across resistor 42 exactly equal and opposite to the potential resulting from the thermionic flow of current. The thermionic currents are thereby eliminated in the charging circuit.

As is well known in the art, the tube 20 is connected to a vacuum pump and baked to remove excess caesium and improve the sensitivity of the mosaic. Lamp 22 is illuminated periodically at the rate of two cycles per second through tubes 26 and 27, being "on" during the discharge period when the mosaic is shorted to the collector and "off" during the charging period. This provides illumination of the entire mosaic 16 of iconoscope 20 to provide photoelectrons to discharge it. The light source 21 is energized to illuminate a spot about ¾" diameter on the mosaic 16. The mosaic is periodically charged at the rate of two cycles per second by relay 12. Armature 11 is actuated to contact 10 thereby connecting resistor 7 and battery 8 to mosaic 16 and anode 17.

Fig. 2 of the drawing illustrates at A the shape of a two-cycle pulse when viewed with a 20-cycle sweep. It is to be noted that pulse A has a duration of 8 or 9% of the total time of charge and discharge, thereby allowing the mosaic 91 or 92 percent of the time in which to discharge, and insuring that the mosaic is completely discharged before the start of the next charging cycle. Armature 11 of relay 12 is normally in the closed position as illustrated in Fig. 1, thereby short circuiting mosaic 16 and anode 17 through contact 14. When relay 12 closes contact 10 in response to two-cycle pulses from pulse generator 30, the voltage transient appearing across load resistor 7 is amplified by direct current amplifier 5 and applied directly to one of the vertical deflection plates 2 of cathode ray tube 1. Since horizontal deflecting plates 3 are connected to the horizontal sweep circuit 4 which is synchronized by 20-cycle source 31, the cathode ray beam sweeps horizontally at a 20-cycle rate. Since the relay is charging and discharging the mosaic at a two-cycle rate in which the charging time is approximately 8 or 9 per cent and the discharge time approximately 91 or 92 per cent, a charging transient will appear on the screen of the cathode ray tube on every tenth horizontal sweep and will have the form illustrated in Fig. 2 at B and C. The height of trace B is indicative of the sensitivity of the mosaic 16, while the initial slope of curve C is indicative of the leakage between islands of the mosaic.

It is to be noted in Fig. 2 that there is a time difference between the lagging edge of the two-cycle pulse A and the initiation of the charging curve. There is also a time difference between the lagging edge of the two-cycle pulse and the cessation of the charge curve C. This results from the finite time required for the actuation of armature 11 of relay 12. The time constant circuit 40 and 41 is provided for the purpose of releasing relay 12 at the end of the two-cycle pulse. Tube 33 is normally cut-off because of its grid current at the time of the two-cycle pulse, and, therefore, during the idle period, condenser 41 charges to the full anode potential of tube 33. On the leading edge of the two-cycle pulse, maximum current passes through the coil of relay 12 to actuate the armature into its upper position. However, the condenser 41 immediately begins to discharge to a voltage determined by resistor 40 and the plate resistance of tube 33. Resistor 40 and the condenser 41 are assigned such values that the discharge of condenser 41 takes place ahead of the lagging edge of the two-cycle pulse. At this instant, the current through the coil relay 12 is near the fall-out value, and, therefore, the armature of relay 12 more readily releases upon the lagging edge of the two-cycle pulse.

From the foregoing, it is evident that cathode ray tube 1 will give a visual indication of the charging characteristics of the mosaic 16 during the complete baking process which forms the mosaic. This indication will have the conformation of the curves B and C in Fig. 2, the height of curve B indicating the sensitivity of mosaic 16. It is obvious that the constant indication of the charging characteristic provides a quantitative indication of the sensitivity and leakage of the mosaic at all times during the baking process. Furthermore, there has been provided an intermittent light source for floodlighting the entire mosaic to provide photoelectrons to discharge the mosaic when contacts 14 are closed, and there has also been provided a circuit for overcoming the effects of thermionic emission in the mosaic circuit.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In an electrical circuit for indicating the charging characteristic of an iconoscope mosaic, an iconoscope comprising a photoelectric surface in the form of a mosaic disposed on an insulating surface, a charging circuit comprising a polarizing means adapted to be connected to said insulating surface, relay means for connecting said polarizing means to said insulating surface, a cathode ray oscillograph including a pair of deflecting plates connected to said charging circuit whereby it deflects the cathode ray in a vertical direction when said charging circuit is connected to said polarizing means, a timing circuit connected to said relay means for periodically energizing it and a second timing circuit coupled to another set of deflecting plates in said cathode ray oscillograph for deflecting said ray at a higher rate in a horizontal direction.

2. In an electrical circuit for indicating the charging characteristic of an iconoscope mosaic, an iconoscope comprising an anode and a photoelectric surface in the form of a mosaic disposed on an insulating surface, a normally open charging circuit comprising a polarizing means adapted to be connected to said insulating surface, relay means for either short circuiting said anode and said insulating surface or connecting said polarizing means to said insulating surface, a cathode ray oscillograph including a pair of deflecting plates connected to said charging circuit whereby it deflects the cathode ray in a vertical direction when said polarizing means is connected to said insulating surface, a timing circuit connected to said relay means for periodically energizing it and a second timing circuit coupled to another set of deflecting plates in said cathode ray oscillograph for deflecting said ray at a higher rate in a horizontal direction.

3. In combination an iconoscope comprising an anode and a photoelectric surface in the form of a mosaic disposed on an insulating surface, a normally open charging circuit comprising a polarizing means adapted to be connected to said insulating surface, relay means for either short circuiting said anode and said insulating surface or connecting said polarizing means to said insulating surface, means for illuminating all of said surface whereby to provide photoelectrons for completely discharging said mosaic, and a timing circuit connected to said illuminating means and to said relay means for periodically energizing and de-energizing them in opposite phase.

4. In an electrical circuit for indicating the charging characteristic of an iconoscope mosaic, an iconoscope comprising a photoelectric surface in the form of a mosaic disposed on an insulating surface, a charging circuit comprising a polarizing means adapted to be connected to said insulating surface, switching means for connecting or disconnecting said polarizing means to charge or discharge said insulating surface, a cathode ray oscillograph including a pair of deflecting plates connected to said charging circuit whereby it deflects the cathode ray in a certain direction when said charging circuit is connected to said polarizing means, a timing circuit connected to said switching means for periodically energizing it and a second timing circuit including an oscillograph sweep circuit connected to another set of deflecting plates in said cathode ray oscillograph for deflecting said ray at a higher rate in a different direction.

5. In an electrical circuit for indicating the charging characteristic of an iconoscope mosaic, an iconoscope comprising an anode and a photoelectric surface in the form of a mosaic disposed on an insulating surface, a normally open charging circuit comprising a polarizing means adapted to be connected to said insulating surface, relay means for either short circuiting said anode and said insulating surface or connecting said polarizing means to said insulating surface, a cathode ray oscillograph including a pair of deflecting plates connected to said charging circuit whereby it deflects the cathode ray in a given direction when said charging circuit is connected to said polarizing means, a timing circuit connected to said relay means for periodically energizing it, a time constant circuit in the output of said timing circuit for timing the duration of each timing pulse and a second timing circuit coupled to another set of deflecting plates in said cathode ray oscillograph for deflecting said ray at a higher rate in a different direction.

6. In an apparatus for measuring the sensitivity of an iconoscope mosaic when said mosaic is formed, an iconoscope comprising an anode and a photoelectric surface in the form of a mosaic disposed on an insulating surface, means for illuminating said photoelectric surface, a charging circuit comprising a polarizing means adapted to be connected to said insulating surface and said anode, a source of potential connected to said charging circuit to oppose flow of current therein resulting from thermionic emission from said surface which occurs when said surface is heated during its formation and means coupled to said charging circuit for indicating the sensitivity of said photoelectric surface to said illuminating means.

7. A method of indicating the charging characteristic of an iconoscope mosaic comprising the steps of illuminating a certain area of said mosaic, charging and discharging said mosaic, controlling the charging and discharging of said mosaic to time the same at a predetermined rate, impressing the voltage transient which occurs during the charging period across one set of deflecting plates in a cathode ray oscillograph to deflect said ray in one direction in accordance with the charging of said mosaic and deflecting the cathode ray in said oscillograph at a higher rate in the other direction to produce an indication of the sensitivity of said mosaic.

8. A method of indicating the charging characteristic of an iconoscope mosaic comprising the steps of constantly illuminating a certain area of said mosaic, charging and discharging said mosaic, controlling the charging and discharging of said mosaic to time the same at a predetermined rate, illuminating the entire mosaic during the discharge period of said mosaic to completely discharge the same, impressing the voltage transient which occurs during the charging period across one set of deflecting plates in a cathode ray oscillograph to deflect said ray in one direction in accordance with the charging of said mosaic and deflecting the cathode ray in said oscillograph at a higher rate in the other direction to produce an indication of the sensitivity of said mosaic.

9. A method of indicating the charging characteristic of an iconoscope mosaic during a baking period comprising the steps of charging and discharging said mosaic, controlling the charging and discharging of said mosaic to time the same at a predetermined rate, impressing the voltage transient which occurs during the charging period across one set of deflecting plates in a cathode ray oscillograph to deflect said ray in one direction in accordance with the charging of said mosaic, counteracting the effects of thermionic emission from said mosaic to prevent false indication by said oscillograph, and deflecting the cathode ray in said oscillograph at a higher rate in the other direction to produce an indication of the sensitivity of said mosaic.

LOUIS F. MAYLE.